(12) United States Patent
Ross et al.

(10) Patent No.: US 8,549,987 B2
(45) Date of Patent: Oct. 8, 2013

(54) PISTON SEAL GUIDE BEARING

(75) Inventors: Daniel P. Ross, Maplewood, MN (US);
Paul R. Quam, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 888 days.

(21) Appl. No.: 12/672,008

(22) PCT Filed: Sep. 2, 2008

(86) PCT No.: PCT/US2008/074990
§ 371 (c)(1),
(2), (4) Date: Feb. 3, 2010

(87) PCT Pub. No.: WO2009/029926
PCT Pub. Date: Mar. 5, 2009

(65) Prior Publication Data
US 2011/0107909 A1    May 12, 2011

Related U.S. Application Data

(60) Provisional application No. 60/969,070, filed on Aug. 30, 2007.

(51) Int. Cl.
*F16J 1/10* (2006.01)
(52) U.S. Cl.
USPC ........................................ 92/165 R; 92/181 R
(58) Field of Classification Search
USPC .......... 92/165 R, 168, 181 R, 181 P; 91/422; 417/495, 511, 513
See application file for complete search history.

(56) References Cited

U.S. PATENT DOCUMENTS

| | | | |
|---|---|---|---|
| 2,730,960 A | 1/1956 | Krause | |
| 3,190,702 A | 6/1965 | Flick | |
| 3,224,817 A | 12/1965 | Miller et al. | |
| 3,334,549 A | 8/1967 | Sheldon | |
| 3,559,540 A | 2/1971 | Sheldon | |
| 3,958,841 A | 5/1976 | Braun | |
| 4,249,868 A * | 2/1981 | Kotyk | 417/511 |
| 4,306,728 A * | 12/1981 | Huperz et al. | 277/536 |
| 4,323,003 A | 4/1982 | Clippard, III | |
| 4,381,179 A * | 4/1983 | Pareja | 92/258 |
| 4,386,782 A | 6/1983 | Reverberi | |
| 4,671,169 A | 6/1987 | Hillier | |
| 5,147,188 A * | 9/1992 | Shaefer | 417/513 |
| 5,605,446 A * | 2/1997 | Handzel et al. | 417/513 |
| 5,715,740 A | 2/1998 | Sims | |
| 5,740,718 A | 4/1998 | Rathweg | |
| 6,212,998 B1 | 4/2001 | Thompson et al. | |
| 6,305,265 B1 * | 10/2001 | Bingham et al. | 92/168 |
| 6,428,014 B2 * | 8/2002 | Scarlett | 277/435 |
| 6,644,430 B2 | 11/2003 | Harer et al. | |
| 7,168,856 B1 | 1/2007 | Weinberger et al. | |
| 2004/0150168 A1 | 8/2004 | Heathcott et al. | |
| 2006/0870418 | 8/2006 | Kojima et al. | |

* cited by examiner

*Primary Examiner* — Thomas E Lazo
(74) *Attorney, Agent, or Firm* — Douglas B. Farrow

(57) ABSTRACT

A priming piston reciprocating pump 10 has piston guide 14 which encircles piston 16 and is provided a bearing member 22 in the inner diameter of the upper end of the guide 14. The bearing 22 is formed of 25% carbon-filled PTFE and may be fitted without tools into the aforementioned ID. Such a bearing 22 allows a negligible clearance to be utilized between the bearing 22 and the piston 16.

2 Claims, 2 Drawing Sheets

PISTON SEAL GUIDE BEARING

This application claims the benefit of U.S. Application Ser. No. 60/969,070, filed Aug. 30, 2007, the contents of which are hereby incorporated by reference.

TECHNICAL FIELD

Background Art

Priming piston reciprocating pumps have been well known for use in pumping highly viscous fluids such as sealants and adhesives. Such pumps have traditionally had a metal-to-metal clearance between the piston guide and the piston on the order of 0.020 inches. The large gap allowed the piston guide and piston seat to rock side to side and wear unevenly and prematurely with such wear increasing the gap which in turn led to even more wear.

DISCLOSURE OF THE INVENTION

It is therefore an object of this invention to provide a priming piston pump which decreases wear of the piston seal, extends the functional life of the piston seal and reduces wear in the piston guide The piston guide is provided with a bearing member in the inner diameter of the upper end (in normal orientation) of the guide. The bearing is formed of 25% carbon-filled PTFE and may be fitted without tools into the aforementioned ID. Such a bearing allows a negligible clearance to be utilized between the bearing and the piston leading to the desired reduction in wear.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
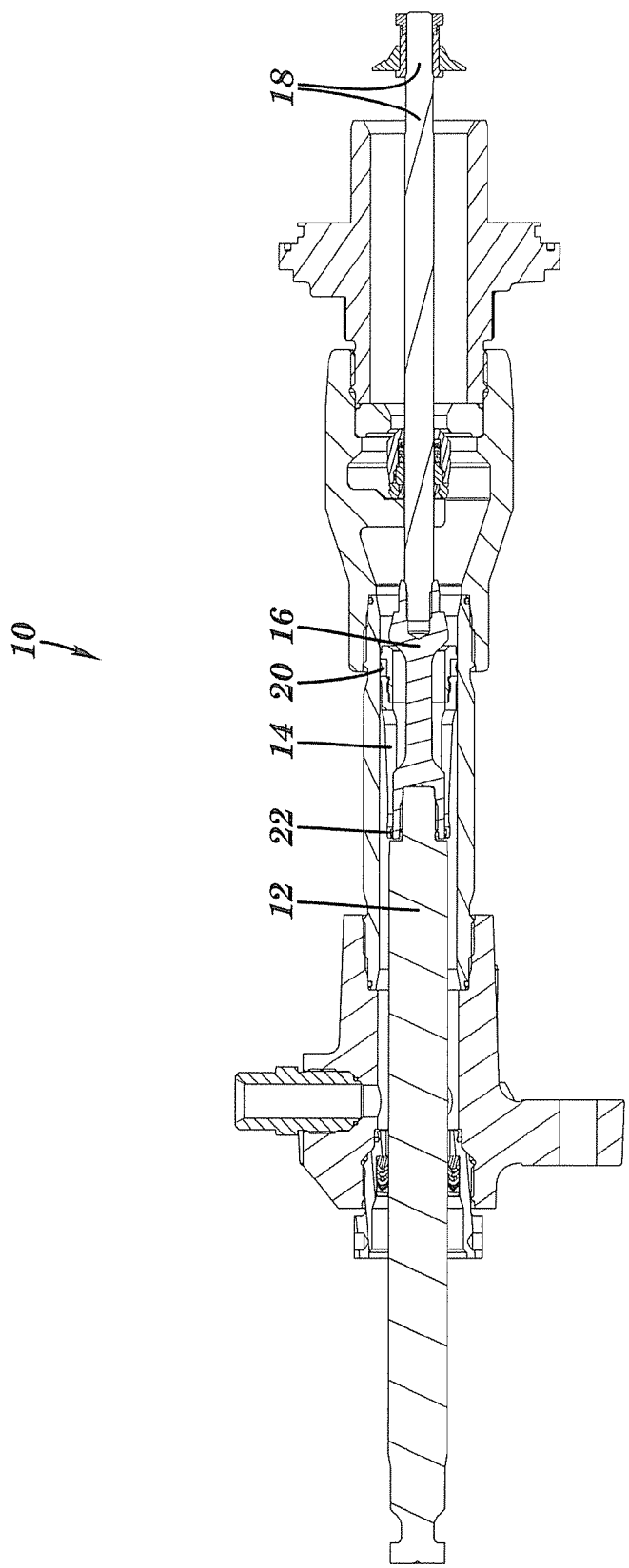
FIG. 1 is a cross-section of a priming piston pump.
Figure 2:
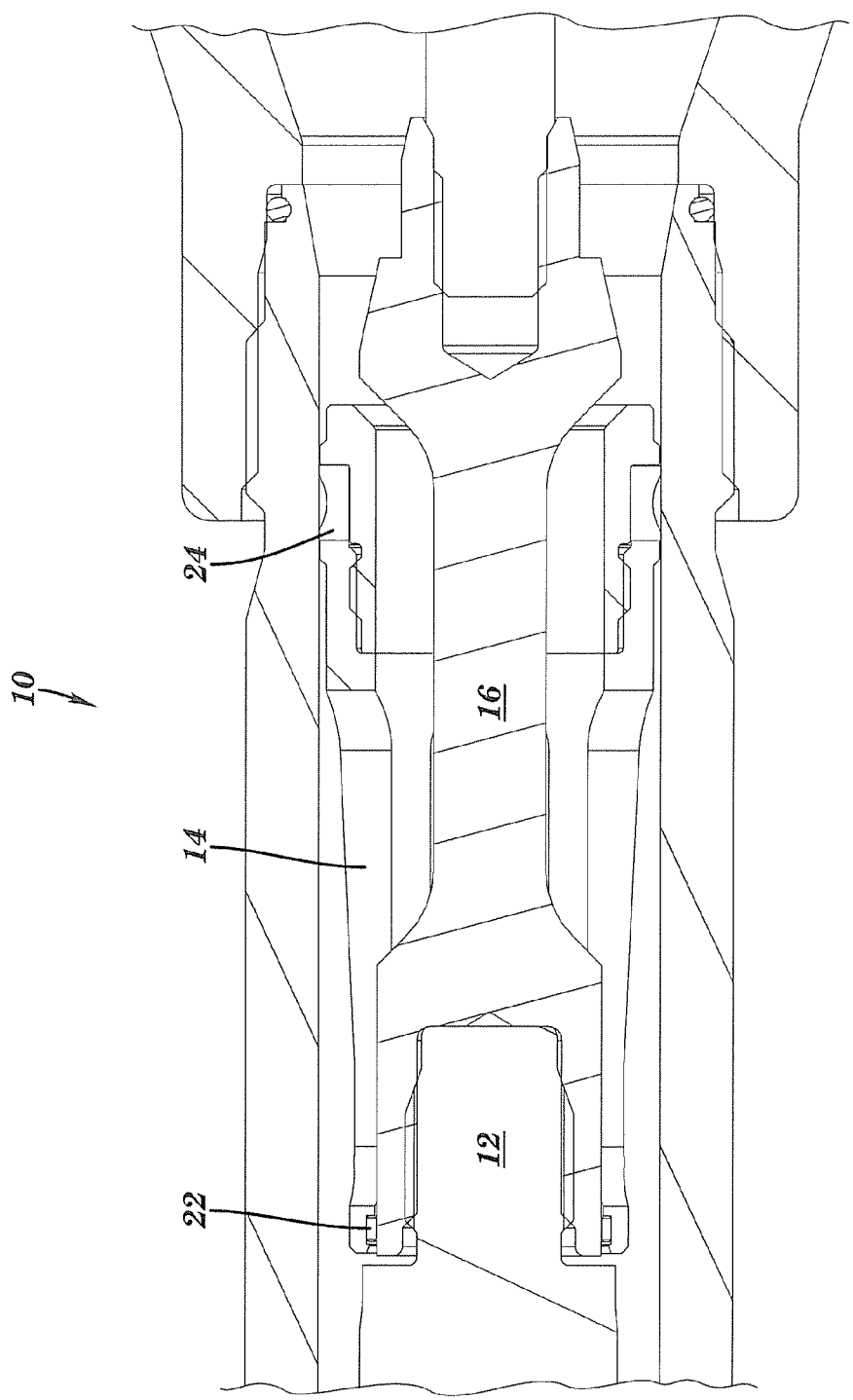
FIG. 2 is a detailed cross-section of the piston guide assembly utilizing the instant invention.

A priming piston reciprocating pump 10 is shown in FIG. 1. A rod 12 has a piston 16 threadedly secured to the lower end (toward the right in the drawings) of rod 12. The piston guide 14 encircles piston 16 and is provided with a bearing member 22 in the inner diameter of the upper end (in normal orientation) of the guide 14. The bearing 22 is formed of 25% carbon-filled PTFE and may be fitted without tools into the aforementioned ID. Such a bearing 22 allows a negligible clearance to be utilized between the bearing 22 and the piston 16. Piston seal 24 is a part of known pumps of this type and is located on the OD of the lower end of guide assembly 14.

It is contemplated that various changes and modifications may be made to the piston guide assembly without departing from the spirit and scope of the invention as defined by the following claims.

The invention claimed is:

1. A priming piston reciprocating pump comprising:
   a rod;
   a piston;
   a piston guide encircling said piston, said guide having an inner diameter, an outer diameter, a lower end and an upper end, said lower end being the end of said guide further from said rod and said upper end being the end of said guide closer to said rod;
   a piston seal located on said outer diameter of the lower end of the guide; and
   a bearing member located in said inner diameter of said upper end of said guide to support and guide.

2. The pump of claim 1 where said bearing is formed of 25% carbon-filled PTFE.

* * * * *